United States Patent [19]

Cox et al.

[11] Patent Number: 5,243,161

[45] Date of Patent: Sep. 7, 1993

[54] DISCONNECT SWITCH WITH VIEWING WINDOW

[75] Inventors: Russell Cox, Frankfort; Thomas F. Keene, Jr., Lexington, both of Ky.

[73] Assignee: Square D Company, Palatine, Ill.

[21] Appl. No.: 854,529

[22] Filed: Mar. 20, 1992

[51] Int. Cl.⁵ .............................................. H01H 9/16
[52] U.S. Cl. .................................................... 200/308
[58] Field of Search ............................. 200/308, 302.1

[56] References Cited

U.S. PATENT DOCUMENTS 3,217,129 11/1965 Hufnagel ............................ 200/308
3,227,831 1/1966 Jacks et al. ..................... 200/308 X
4,107,492 8/1978 Moon, Jr. et al. ............... 200/308 X
4,835,348 5/1989 Poling et al. .................... 200/308 X Primary Examiner—Renee S. Luebke
Attorney, Agent, or Firm—Larry I. Golden; Kareem M. Irfan; Wayne H. Stoppelmoor

[57] ABSTRACT

An electrical disconnect switch having a viewing window for viewing the internal switching mechanism is disclosed. The viewing window utilizes gaskets, rivets, a substantially transparent viewing window plate, and a viewing window retainer to provide a dust-tight, water-tight and drip-tight viewing window.

7 Claims, 2 Drawing Sheets

DISCONNECT SWITCH WITH VIEWING WINDOW

BACKGROUND OF THE INVENTION

Electrical disconnect switches are well known in the prior art. An example of such an electrical disconnect switch is disclosed in U.S. Pat. No. 4,302,643 entitled "Fusible Switch" which is assigned to the same assignee as the present application, and is hereby incorporated by reference.

Electrical disconnect switches interrupt current flowing through an electrical circuit. Opaque covers have been provided for enclosing a switching mechanism within an enclosure and protect personnel against electrical arcing. However, when the disconnect switch is in the closed, or "ON," position the user can not open the cover and visually inspect the position of the current conducting blades. Without a viewing window, the user must turn "OFF" the switch and open the cover to visually inspect the blade position. In certain situations it is desirous to visually inspect the blade position while the switch is "ON".

A need, therefore, exists for an electrical disconnect switch that allows the user to visually inspect the position of the blades without opening the cover of the switch while the switch is in the "ON" position, yet will provide protection in the event of electrical arcing of the switch contacts.

One way of providing a transparent shield that allows users to visually inspect the position of the blades is shown in U.S. Pat. No. 4,110,584 entitled "Load Break Switch With Transparent Internal Shield." However, this design uses a transparent shield that is supported across the front of the switch contacts and is located inside the housing so that it will visually expose the contacts when the cover is open. The transparent shield shown in U.S. Pat. No. 4,110,584 is separate from the cover thus requiring the user to open the cover prior to visually inspecting the contacts or blades. It is desirous to provide a disconnect switch that would allow the user to visually inspect the blades without opening the switch cover as is required by the aforementioned patent.

SUMMARY OF THE INVENTION

The device of the present invention generally relates to electrical disconnect switches and, more particularly, an electrical disconnect switch having a viewing window that allows the user to visually inspect the blade position without opening the cover of the switch. The invention consists of a special cover design having a viewing window for viewing the blades. The design utilizes gaskets that prevent dust, water, and other particles from entering into the electrical switch, thusly, allowing the switch to be approved for dust-tight, drip-tight, water-tight, and corrosion resistant environments. The manner of assembly and design features of this electrical disconnect switch allow it to have the features of a viewing window and also meet all Underwriters Laboratories (UL) and Canadian Standards Association (CSA) requirements for NEMA 12 and NEMA 4, 4x, and 5 switches.

In accordance with one aspect of this invention, there is provided an electrical disconnect switch for interrupting the flow of electrical current having a switching mechanism within an enclosure, a cover attached to the enclosure having an opening therein and a viewing window plate covering the opening, and a viewing window retainer for securing the viewing window plate to the cover.

In accordance with another aspect of this invention, there is provided a method of assembling a viewing window in an electrical disconnect switch comprising the steps of providing an opening in a cover, positioning a gasket against the cover, inserting a viewing window plate against the gasket, placing a retaining plate over the viewing window plate, and securing the retaining plate to the cover.

It is an object of this invention to provide an electrical disconnect switch having a viewing window for visually inspecting the position of the switch blades without opening the switch cover.

Another object of this invention is to provide a method of assembly of a viewing window into an electrical disconnect switch.

Other objects and features of the present invention will become apparent on examination of the following specification and claims together with the drawings.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

For exemplary purposes, the invention is shown and described with respect to a three-pole electrical disconnect switch, although the various aspects of the invention are equally applicable to electrical switches having single or multiple of poles. The disconnect switch constructed in accordance with the teachings of the present invention is shown in FIGS. 1-3.

Figure 1:
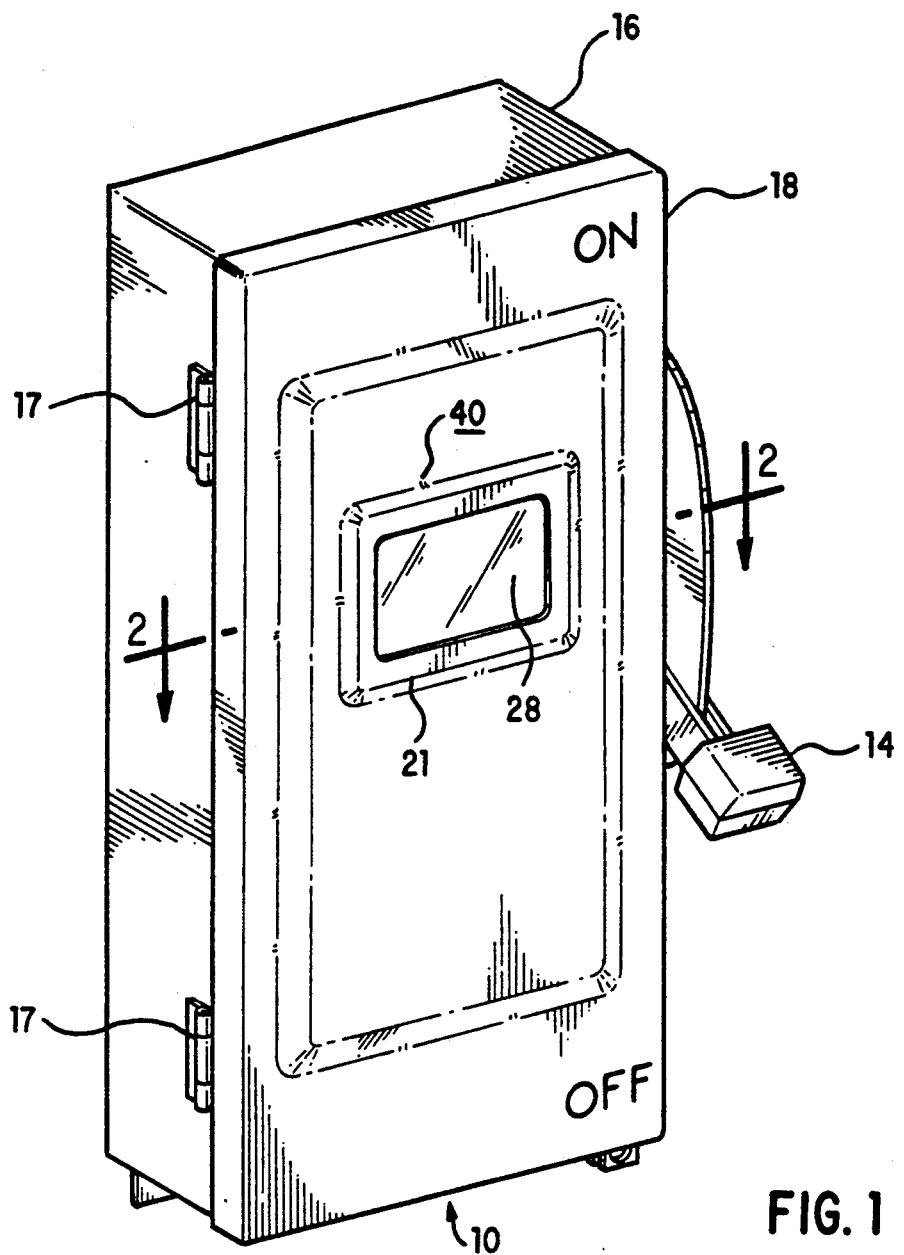
FIG. 1 is a perspective view of an electrical disconnect switch constructed in accordance with the present invention.
Figure 2:
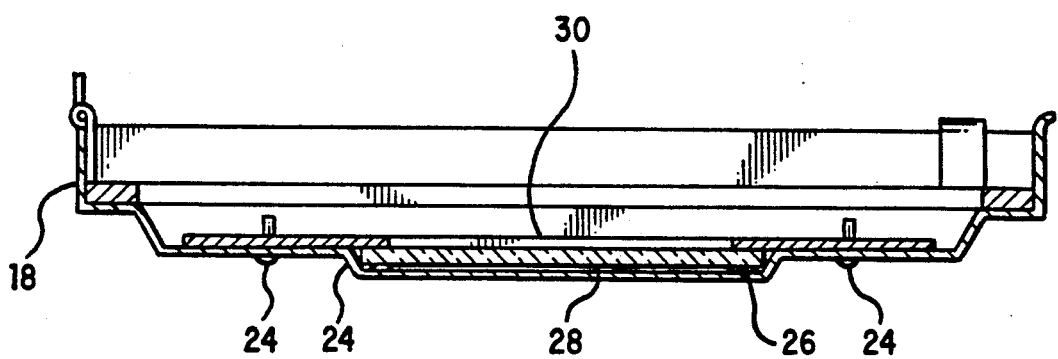
FIG. 2 is a cross sectional view of the electrical disconnect switch of FIG. 1, taken generally along the line 2—2 of FIG. 1.

Referring to FIG. 1, an electrical disconnect switch 10 is shown having an enclosure 16 with cover 18 pivotally coupled thereto using a well known rotatable hinging system, such as hinges 17. The enclosure 16 and cover 18 are conventionally formed using sheet metal. Hinges 17 are secured to enclosure 16 and cover 18 through welding, riveting, or some other well known process. Handle 14 interacts with the switching mechanism 12 (FIG. 3) causing the blades (not shown) to close when the handle 14 is in the "ON" position and causing the blades to open when the handle 14 is moved to the "OFF" position. Viewing window 40 is shown having viewing window plate 28 located in an escutcheon 21.

Figure 3:
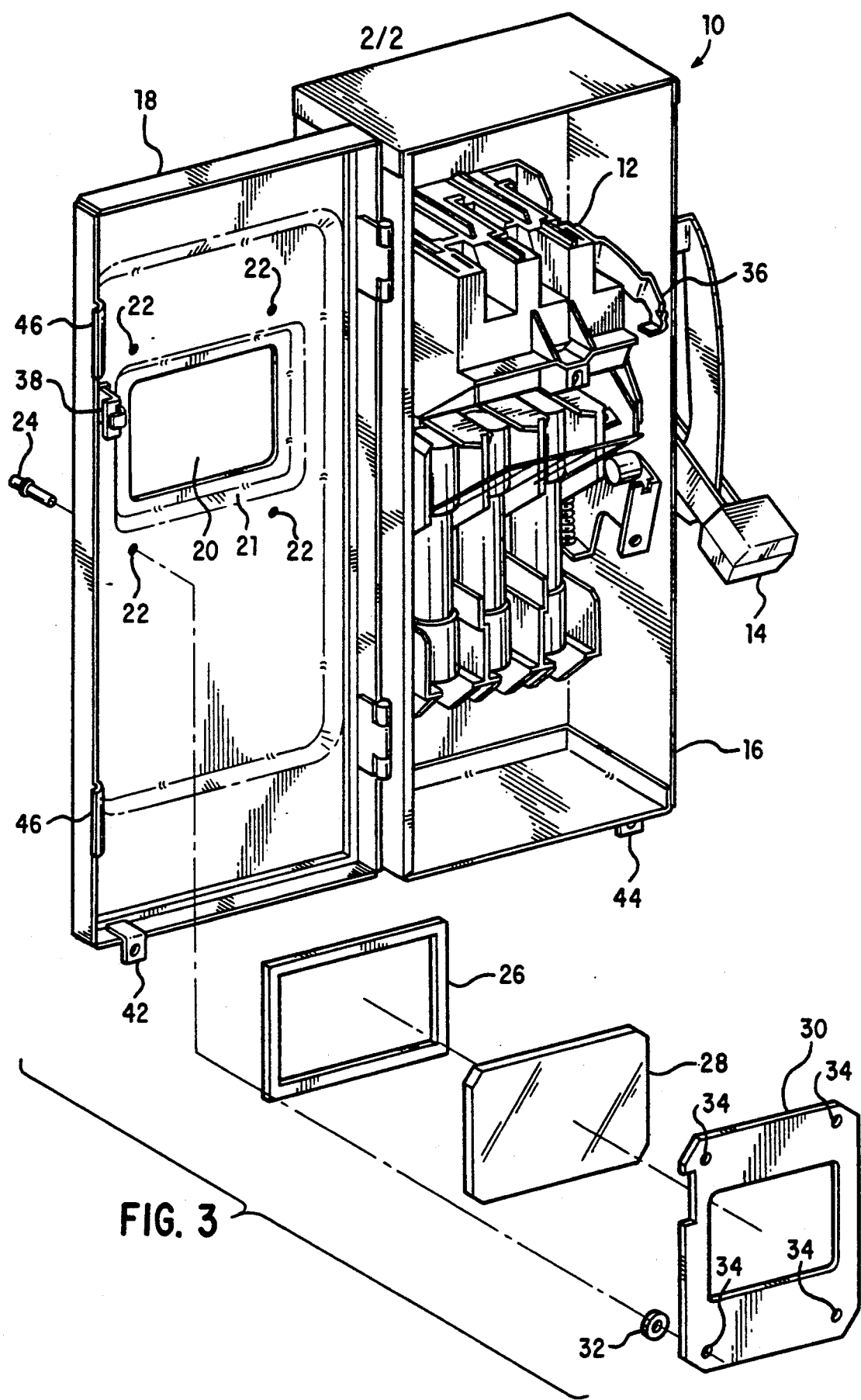
FIG. 3 is an exploded, perspective view of the electrical disconnect switch of FIG. 1 showing the electrical disconnect switch with the cover open and the parts that fit into the cover.

Referring now to FIG. 3, enclosure 16 is shown with cover 18 in the open position exposing switching mechanism 12. Switching mechanism 12 can be constructed using any of the teachings of the prior art, such as the switching mechanism shown in U.S. Pat. No. 4,302,643. However, the switching mechanism shown in U.S. Pat.

No. 4,302,643 merely illustrates one of a number of different forms of switching mechanisms in which the present invention may incorporate. As discussed earlier, handle 14 operates the switching mechanism from an "ON" (up) position to an "OFF" (down) position and vice versa.

Locking arm 36 being pivotally coupled to the enclosure 16 engages lock 38, that is coupled to cover 18, when the cover is closed and the handle 14 is in the "ON" position, thusly, preventing cover 18 from being opened. The cover is prohibited from being opened until the user positions handle 14 to the "OFF" position. Locking arm 36 also interacts with the handle 14 to prohibit the disconnect switch from being turned "ON" when the cover 18 is open. Tabs 46 are part of a known external latching system (not shown) that is provided to assure that the cover 18 remains securely closed when the switch is in the "OFF" or "ON" position.

Now referring to FIGS. 2 and 3, cover 18 is shown having a window opening 20 and escutcheon 21. A viewing window plate 28 is pressed against a gasket 26 that is positioned against the cover 18 in the escutcheon 21. The gasket 26 is preferably made of Rubatex ® R-114-N and the substantially transparent viewing window plate 28 is made of a shatterproof and flame resistant polymeric material, such as Lexan ® MR-5. Gasket 26 prevents entry of water or dust from seeping around the viewing window plate 28. Viewing window retainer 30 is placed over the viewing window plate 28 and maintains the viewing window plate 28 firmly in the cover escutcheon 21. Viewing window retainer 30 is preferably made of stainless steel. Stainless steel closed end pop rivets 24 are inserted through cover rivet holes 22, and through corresponding viewing window retainer rivet holes 34, and are fastened in place to secure the viewing window plate 28 to the cover 18. A pop rivet gasket 32 is disposed between the cover 18 and the viewing window retainer 30 at every pop rivet location. Pop rivet gaskets 32 prevent entry of dust or water into the electrical disconnect switch through cover rivet holes 22.

Viewing window plate 28 is positioned over the switch blades and protects the switch user from arcing when the switch is opened (turned "OFF") while allowing the user a means for visually inspecting the position of the blades prior to opening the cover. For example, if the switch was suppose to be "OFF" (handle in the "OFF" position, allowing the cover to be opened) but has remained "ON" due to a malfunction, the user can immediately see that the switch blades are closed thus indicating to him that proper safety precautions need to be taken prior to opening the cover.

A cover locking flange 42 is disposed on the cover 18 and positioned to correspond to an enclosure locking flange 44 disposed on the enclosure 16 when the cover is closed. Both cover locking flange 42 and enclosure locking flange 44 have locking apertures therein for providing a means for passing a locking means therethrough when the cover is closed to prevent unauthorized opening of the cover.

The present invention may incorporate a fuse puller for allowing ease of fuse removal as shown in U.S. Pat. No. 4,288,138 entitled "Fuse Puller" which is assigned to the same assignee as the present invention, and is hereby incorporated by reference. The present invention is not limited to the use of a fuse puller, it is merely stated here for illustrated purposes.

While there have been shown and described what are at present considered the preferred embodiments of the invention, it will be obvious to those skilled in the art that various changes and modifications may be made therein without departing from the scope of the invention as defined by the appended claims.

What is claimed is:

1. An electrical disconnect switch for interrupting the flow of electrical current, said electrical disconnect switch comprising:
   an enclosure;
   a switching mechanism disposed within said enclosure;
   a cover attached to said enclosure having an opening therein;
   a viewing window plate disposed against said cover, wherein said viewing window plate covers the opening in said cover;
   a viewing window retainer positioned against said viewing window plate; and
   securing means for securing said viewing window retainer to said cover, said securing means comprising a plurality of pop rivets disposed in apertures within said cover and said viewing window retainer.

2. An electrical disconnect switch according to claim 1, wherein said viewing window plate is substantially transparent.

3. An electrical disconnect switch according to claim 1, wherein said viewing window plate is substantially shatterproof.

4. An electrical disconnect switch according to claim 1, wherein said viewing window plate is substantially flame resistant.

5. An electrical disconnect switch according to claim 1, wherein said viewing window plate is secured in an escutcheon extending from said cover.

6. An electrical disconnect switch according to claim 1, further comprising a gasket disposed between said cover and said viewing window retainer, wherein said gasket prevents water and dust from entering said electrical disconnect switch.

7. An electrical disconnect switch according to claim 1, further comprising a pop rivet gasket disposed around each one of said plurality of pop rivets and disposed between said cover and said viewing window retainer, wherein said pop rivet gasket prevents water and dust from entering said electrical disconnect switch.

* * * * *